United States Patent Office 3,203,914
Patented Aug. 31, 1965

3,203,914
OVERCOMING METAL SOAP INHIBITION OF HALOGENATED BUTYL RUBBER CURE
Delmer L. Cottle, Highland Park, Irwin J. Gardner, Roselle Park, Alfred L. Miller, Cranford, and Leon S. Minckler, Jr., Metuchen, N.J., assignors to Esso Research and Engineering Company, a corporation of Delaware
No Drawing. Filed Nov. 8, 1960, Ser. No. 67,924
14 Claims. (Cl. 260—23.7)

The present invention deals with improving the vulcanizates obtained from halogenated copolymers of a major portion of an isoolefin and a minor portion of a multiolefin. More particularly, it deals with overcoming the inhibition of a halogenated butyl rubber cure due to the presence of metal fatty acid salts by the combination of zinc oxide and a heavy metal halide.

Copolymers of the above general class, particularly where the copolymers contain about 85 to 99.5 wt. percent of a $C_4$ to $C_8$ isoolefin, e.g., isobutylene, with about 15 to 0.5 wt. percent of a multiolefin of about 4 to 14 carbon atoms, e.g., myrcene, isoprene, butadiene, etc., are well known in the literature as "butyl rubber." For example, see "Synthetic Rubber" by G. S. Whitby. and U.S. Patent 2,356,128 among many others. Polymerization is generally carried out at low temperatures, i.e., —50 to 165° C. in the presence of a Friedel-Crafts catalyst such as aluminum chloride dissolved in a lower alkyl halide. Butyl rubber has a viscosity average molecular weight of 200,000 to 1,500,000 and mole percent unsaturated of about 0.1 to 30. Halogenated butyl rubber-type copolymers are produced by halogenating butyl rubber in a manner which does not substantially degrade its molecular weight but does, however, give a rubbery product of substantially different properties than the unhalogenated material. Butyl rubber may be halogenated at temperatures of —50 to 200° C., preferably 0 to 100° C., at pressures of 0.5 to 900 p.s.i.a., with suitable halogenating agents such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by various means such as flashing off the hydrocarbon solvent by injection into a hot water bath.

Preferably, the degree of halogenation is carefully regulated so that the halogenated copolymer contains at least 0.5 wt. percent of combined halogen but no more than about 1 atom of combined fluorine or chlorine per double bond in the polymer, nor more than 3 atoms of combined bromine or iodine per double bond. The brominated and chlorinated copolymers are preferred. A more detailed description of the formation of chlorinated butyl rubber may be had by referring to coassigned U.S. Patent 2,944,578, filed May 31, 1955.

The halogenated copolymer has a viscosity average molecular weight of about 100,000 to 2,000,000 and a mole percent unsaturation of between 0.1 to 20, preferably less than 10. As hereinafter employed in the specification, the term "halogenated butyl rubber" denotes the above-described halogenated copolymers of a major portion of a $C_4$ to $C_8$ isoolefin and a minor portion of a $C_4$ to $C_{14}$ multiolefin.

One of the problems encountered in the production of such halogenated rubbery copolymers is the agglomeration of the halogenated copolymers during the recovery operation. Agglomeration occurs when the polymer and hydrocarbon diluent are introduced into a hot water bath-flashing zone so as to form an aqueous suspension. It has recently been suggested that this difficulty can be overcome by the use of a slurry aid which is an alkaline earth metal salt of a $C_5$ to $C_{30}$ monocarboxylic fatty acid. The preferred slurry aids are $C_{10}$ to $C_{22}$ calcium, magnesium, or barium, naphthenates, oleates, linoleates, ricinoleates, polythionates, and especially stearates. These alkaline earth metal salts are generally added to the hot water through which the halogenated butyl rubber from the polymerization stage is discharged. The halogenated butyl rubber is thereafter recovered and subsequently processed.

Although the above alkaline earth metal salts of fatty acids have proven to be effective slurry aids, their presence in the recovered halogenated butyl rubber copolymer has been found to retard the cure rate of the rubber. In spite of the fact that they may be present in relatively small concentrations, e.g., 0.1 to 10 parts by weight per 100 parts by weight of rubber, their effect on cure rate may be a serious disadvantage, particularly in applications requiring a fast cure rate, such as wire coatings, extrusions of tubes, conveyor belting, etc. This is particularly so when the concentration of the alkaline earth metal salt is above 0.3 phr.

It has now been found that the inhibition of the cure rate of halogenated butyl rubber occasioned by the presence of minor quantities of alkaline earth fatty acid salts, such as calcium stearate, is effectively overcome by the incorporation of a combination of zinc oxide and a heavy metal halide. The metal halide is a halide of a metal chosen from the group consisting of II–B (zinc), IV–B (tin and germanium), V (antimony and arsenic), and VIII (iron, cobalt and nickel) metals, the groups being designated according to the Periodic Chart designed in 1924 by Henry D. Hubbard and revised in 1940 by William F. Meggers, revised edition 1959, sold and distributed by the W. M. Welch Manufacturing Company and entitled "Periodic Chart of the Atoms."

Normally the zinc oxide will be present in the range of 0.5 to 15, preferably 1 to 5, wt. percent based on a rubbery copolymer. The heavy metal halide will normally be present in an amount ranging from 0.05 to 10, preferably 0.1 to 5, parts by weight per 100 parts by weight of rubbery copolymer. Among the various metal halides suitable for the practice of the present invention are the following: zinc chloride, zinc bromide, zinc iodide, iron chloride, iron bromide, antimony chloride, antimony bromide, stannous chloride, stannous fluoride, stannous bromide, germanium chloride, arsenous chloride, arsenous bromide, cobalt bromide, nickel bromide, etc.

It is to be clearly noted that while alkaline earth fatty acid salts profoundly inhibit the cure rate of halogenated butyl rubber, they have substantially no retardation effect on the cure of unhalogenated butyl rubber. Thus, unhalogenated butyl rubber is free of the problem which the present invention serves to solve. Similarly, halogenated butyl rubber compositions containing other slurrying aids, such as zinc stearates, do not suffer from cure inhibition and thus present a different problem.

Curing may be effected at temperatures ranging from 200 to 400° F., preferably 250 to 350° F., as well as under various conditions, e.g., open steam heating, or in curing during extrusion or molding, etc.

Vulcanization recipes prepared in accordance with the present invention may contain various additional materials such as carbon black, mineral fillers, pigments, extender oils, etc. If desired, blends of halogenated butyl rubber and other rubbery polymers, e.g., natural rubber, butadiene-styrene, etc., may be covulcanized in accordance with the present invention.

In addition to the use of a combination of zinc oxide and a heavy metal halide to cure halogenated butyl rubber containing inhibiting quantities of alkaline earth metal fatty acid salts, various conventional curing agents may also optionally be present. Examples of the latter are sulfur, tetramethyl thiuram disulfide, benzothiazyl disulfide, tellurium diethyl dithiocarbamate, etc.

It is to be noted that a combination of both zinc oxide and a halide of a heavy metal chosen from the group consisting of Groups II–B, IV–B, V, and VIII metals is necessary to effectively overcome the adverse effect of alkaline earth metal fatty acid salts on curing. The use of a halide of a heavy metal in the absence of zinc oxide gives an unsatisfactory vulcanizate due to overcuring.

The various aspects and modifications of the present invention will be made more clearly apparent by referring to the following description and accompanying examples.

In the following example, two typical halogenated about 1 to 2 wt. percent of an alkaline earth metal fatty acid salt, i.e., calcium stearate. The hydrocarbon diluent is thus flashed off and a slurry formed. The halogenated butyl rubber was thereafter recovered from the resulting slurry filtration, and then dried in the conventional manner. Several runs were made using various quantities of calcium stearate.

Samples of halogenated copolymer admixed with various quantities of calcium stearate were thereafter compounded for vulcanization in the presence and absence of a combination of zinc oxide and a halide of a heavy metal, i.e., zinc chloride. The properties of the vulcanizates thus obtained are shown in Table I. The concentration of the various constituents are indicated in parts by weight by 100 parts by weight of rubbery polymer, i.e., phr.

*Table I*

| Sample No. | 1 | 1' | 2 | 2' | 3 |
|---|---|---|---|---|---|
| Chlorinated butyl rubber A | 100 | 100 | 100 | 100 | 100 |
| Carbon black (SRF—black), phr. | 50 | 50 | 50 | 50 | 50 |
| Stearic acid, phr. | 1 | 1 | 1 | 1 | 1 |
| ZnO, phr. | 5 | | 5 | 5 | 5 |
| ZnCl$_2$, phr. | | | 0.5 | 0.5 | |
| Calcium stearate, phr.[2] | 0.30 | 0.30 | 2.7 | 2.8 | 3.0 |
| Cure time at 307° F. in mins. | 30 \| 60 | 30 \| 60 | 30 \| 60 | 30 \| 60 | 30 \| 60 |
| 300% modulus, p.s.i. | 925 \| 955 | 700 \| 750 | | 483 \| 690 | |
| Ult. tensile, p.s.i. | 1,635 \| 1,600 | 1,740 \| 1,740 | N.C.[1] | 1,117 \| 1,700 | N.C. |
| Elongation, percent | 445 \| 430 | 540 \| 530 | | 574 \| 510 | |

| Sample No. | 3' | 4 | 4' | 4'' | 5 | 5' |
|---|---|---|---|---|---|---|
| Chlorinated butyl rubber A | 100 | 100 | 100 | 100 | 100 | 100 |
| Carbon Black (SRF—Black), phr. | 50 | 50 | 50 | 50 | 50 | 50 |
| Stearic Acid, phr. | 1 | 1 | 1 | 1 | 1 | 1 |
| ZnO, phr. | 4.5 | 5 | 5 | 5 | 5 | 5 |
| ZnCl$_2$, phr. | 1.4 | | 0.5 | 1.0 | | 2.0 |
| Calcium Stearate, phr.[2] | 3.0 | 5.3 | 5.3 | 5.3 | 7.6 | 7.6 |
| Cure Time at 307° F. in mins. | 30 | 30–210 | 30 \| 60 | 30 \| 60 | 30–210 | 90 |
| 300% Modulus, p.s.i. | 570 | | 730 \| 770 | 670 \| 760 | | 240 |
| Ult. Tensile, p.s.i. | 1,660 | [1] N.C | 1,600 \| 1,640 | 1,720 \| 1,770 | N.C. | 550 |
| Elongation, percent | 650 | | 500 \| 530 | 520 \| 520 | | 670 |

[1] N.C.—No cure.
[2] 1 wt. percent of calcium stearate equals 661 p.p.m. of Ca ion.

butyl rubber copolymers, denoted "chlorinated butyl rubber A" and "brominated butyl rubber B," were employed. The characteristics of these typical halogenated butyl rubbers are indicated below.

|  | Chlorinated butyl rubber A | Brominated butyl rubber B |
|---|---|---|
| Wt. percent isobutylene | 97 | 96 |
| Wt. percent isoprene | 1.8 | 1.8 |
| Wt. percent chlorine | 1.2 | 0 |
| Wt. percent bromine | 0 | 2.2 |
| Viscosity average molecular weight | 350,000 | 400,000 |
| Mole percent unsaturation | 0.6 | 0.8 |

EXAMPLES 1 TO 6

Chlorinated butyl rubber A was recovered from a conventional chlorination step by injecting the polymer in hydrocarbon diluent into a hot water bath containing As shown in Table I, the presence of minor quantities, particularly above 0.30 phr., of alkaline earth metal salts inhibits the cure rate of halogenated butyl rubber. As illustrated in Table I, the use of a combination of zinc oxide and zinc chloride uniformly overcomes the cure inhibition effect of calcium stearate at any level between 0.3 and 7.6 phr., and vulcanizates of good properties are obtained within a relatively short curing period.

EXAMPLES 7 TO 9

In a manner similar to that described above, chlorinated butyl rubber containing a minor portion of calcium stearate was compounded with various conventional curing agents, such as sulfur, Tuads, Tellurac, and Altax. Each sample contains the masterbatch formulation and the additional constituents indicated in parts by weight. In samples D, E, and F, the combination of zinc oxide and a heavy metal halide was additionally present. The various recipes were cured at 307° F. for the periods indicated.

Table II

| Formulation, masterbatch: | | | | | | |
|---|---|---|---|---|---|---|
| Chlorinated butyl rubber A | 100 | 100 | 100 | 100 | 100 | 100 |
| Carbon black (SRF—Black) | 50 | 50 | 50 | 50 | 50 | 50 |
| Stearic acid | 1 | 1 | 1 | 1 | 1 | 1 |
| Samples | A | B | C | D | E | F |
| Tetramethyl thiuram disulfide (Tuads) | 0.5 | ---- | 1.0 | 0.5 | ---- | 1.0 |
| Tellurium dithiocarbamate (Tellurac) | ---- | 1.0 | ---- | ---- | 1.0 | ---- |
| Benzothiazyl disulfide (Altax) | 0.25 | ---- | ---- | 0.25 | ---- | ---- |
| Sulfur | 2.0 | 2.0 | ---- | 2.0 | 2.0 | ---- |
| Zinc oxide | 5.0 | 5.0 | 5.0 | 5.0 | 5.0 | 5.0 |
| Calcium stearate | 2.0 | 2.0 | 2.0 | 2.0 | 2.0 | 2.0 |
| Zinc chloride | ---- | ---- | ---- | 0.5 | 0.5 | 0.5 |
| Original physical properties: | | | | | | |
| Cure time at 307° F | | | | (¹) | (¹) | |
| 300% modulus, p.s.i | 250 | 300 | 275 | 750 | 950 | 1,320 |
| Tensile, p.s.i | 600 | 860 | 650 | 1,675 | 1,880 | 1,610 |
| Elongation, percent | 745 | 755 | 705 | 615 | 540 | 380 |
| Cure time at 307° F | | | | (²) | (²) | |
| 300% modulus, p.s.i | 600 | 580 | 640 | 1,010 | 1,220 | 1,350 |

¹ 10 minutes.
² 20 minutes.

As shown in Table II, for a 10-minute cure the addition of one-half part of zinc chloride brought a three to fivefold increase in the 300% modulus of vulcanizates containing minor portions of an alkaline earth metal salts of a fatty acid (compare samples C and F). A related improvement is found in tensile properties. Table II further illustrates that various conventional curing agents may be present in the compositions of the present invention, but it is only the combination of zinc oxide and a heavy metal halide which effectively overcomes the cure inhibition due to the presence of an alkaline earth metal fatty acid salt.

EXAMPLES 10 TO 12

To further illustrate the nature of the present invention, chlorinated butyl rubber A containing 3.3 phr. of calcium stearate was compounded with various heavy metal halides in combination with zinc oxide. Control sample A, when compared to sample B, illustrates the inhibiting effect of alkaline earth metal fatty acid salts.

The various recipes shown in Table III were cured at 307° F. for the period indicated and the properties of the resulting vulcanizates thereafter determined.

EXAMPLE 13

Brominated butyl rubber B containing an alkaline earth metal salt of a fatty acid, i.e., calcium stearate, was compounded for curing as indicated in Table IV.

Table IV

| | | |
|---|---|---|
| Brominated butyl Rubber B | 100 | 100 |
| Carbon black (Pelletex SRF) | 50 | 50 |
| Stearic acid | 1 | 1 |
| ZnO | 5 | 5 |
| Tetramethyl thiuram disulfide | 1 | 1 |
| ZnCl₂ | 0 | 0.5 |
| Calcium stearate | 2.0 | 2.0 |
| Cured 5 min. at 307° F.: | | |
| Tensile, p.s.i | 1,040 | 1,340 |
| Elongation, percent | 190 | 220 |

As shown in Table IV, compositions of brominated butyl rubber cured in accordance with the present invention show substantially improved physical properties as compared to conventional cures.

EXAMPLES 14 TO 16

To illustrate the use of various metal halides in conjunction with zinc oxide as a means of overcoming the cure Table III Masterbatch Chlorinated Butyl Rubber A _____ 100
Masterbatch Carbon Black (Pelletex SFR) _____ 50

| Samples | A | | | B | | | C | | | D | | | E | | |
|---|---|---|---|---|---|---|---|---|---|---|---|---|---|---|---|
| | (control) | | | | | | | | | | | | | | |
| Zinc oxide | 3 | | | 3 | | | 3 | | | 3 | | | 3 | | |
| Calcium stearate | | | | 3.3 | | | 3.3 | | | 3.3 | | | 3.3 | | |
| Zinc chloride | | | | | | | 0.5 | | | | | | | | |
| Zinc bromide | | | | | | | | | | 0.8 | | | | | |
| Stannous chloride×2H₂O | | | | | | | | | | | | | 0.7 | | |
| Cure time at 307° F. (mins.) | 30 | 60 | 90 | 30 | 60 | 90 | 30 | 60 | 90 | 30 | 60 | 90 | 30 | 60 | 90 |
| Modulus at 300 p.s.i | 1,015 | 1,080 | 1,250 | 145 | 230 | 400 | 650 | 960 | 1,160 | 870 | 1,095 | 1,105 | 725 | 870 | 930 |
| Tensile, p.s.i | 1,805 | 1,680 | 1,870 | 235 | 420 | 745 | 1,450 | 1,725 | 1,615 | 1,575 | 1,615 | 1,685 | 1,315 | 1,430 | 1,380 |
| Elongation, percent | 490 | 495 | 475 | 1,185 | 900 | 650 | 540 | 615 | 400 | 500 | 515 | 495 | 530 | 445 | 425 |

As shown in Table III, the presence of calcium stearate greatly inhibits the cure rate of chlorinated butyl rubber A. However, the use of zinc oxide and a heavy metal halide such as zinc chloride, zinc bromide, or stannous chloride effectively overcame this cure inhibition and gave a high quality vulcanizate.

inhibition due to the presence of alkaline earth metal fatty acid salts, chlorinated butyl rubber A containing 1.37 phr. of calcium stearate was compounded with zinc oxide and 1 part per hundred of rubber of the heavy metal halides indicated in Table V. The recipes shown were then steam cured for 1 hour at 212° F., the tensile properties of the resulting vulcanizates illustrating the degree of cure obtained.

Table V

| Masterbatch (parts by weight): | | | | |
|---|---|---|---|---|
| Chlorinated Butyl Rubber A | 100 | 100 | 100 | 100 |
| Carbon Black | 50 | 50 | 50 | 50 |
| Stearic Acid | 1 | 1 | 1 | 1 |
| ZnO | 5 | 5 | 5 | 5 |
| Recipe | 1 | 2 | 3 | 4 |
| Activator | FeCl₃ | SbCl₃ | SnCl₂x2H₂O | None |
| Mooney Scorch at 212° F.— | | | | |
| Minutes to 5 pt. rise | 9 | 5 | 5 | 17 |
| Cure: Steam—1 hr. at 212° F.— | | | | |
| Tensile, p.s.i | 835 | 1,265 | 1,195 | N.C. |

As illustrated in Table V, metal halides of Group IV–B (tin), V (antimony), and VIII (iron) metals may be employed in conjunction with zinc oxide to overcome the cure inhibition due to the presence of calcium stearate whereas no cure was obtained in the absence of said metal halides. Vulcanizates of good tensile properties can thus be obtained within a one-hour steam cure.

Various modifications may be made to the present invention. Although the alkaline earth metal fatty acid salts are normally present due to their use as slurrying aids in the recovery of halogenated butyl rubber from the polymerization operation, such inhibiting salts may have been admixed with the copolymer at other stages in the overall operation.

Having described the present invention, that which is sought to be protected is set forth in the following claims.

What is claimed is:

1. A composition of matter consisting essentially of a halogenated rubbery copolymer of a major portion of a $C_4$ to $C_8$ isoolefin and a minor portion of a $C_4$ to $C_{14}$ multiolefin; a cure inhibiting amount of an alkaline earth metal salt of a fatty acid, carbon black; and a minor portion based on the copolymer of a combination of zinc oxide and a halide of a heavy metal chosen from the group consisting of Group II–B, IV–B, V, and VIII metals.

2. The composition of claim 1 wherein said metal halide is a zinc halide.

3. The composition of claim 1 wherein said inhibiting amount is at least 0.3 part by weight per 100 parts of the rubbery copolymer.

4. A composition consisting essentially of a major portion of a rubbery halogenated copolymer of about 85 to 99.5 wt. percent of a $C_4$ to $C_8$ isoolefin and about 15 to 0.5 wt. percent of a $C_4$ to $C_{14}$ multiolefin, said copolymer being halogenated with a member of the group consisting of chlorine and bromine; a minor portion of at least 0.3 part by weight per 100 parts of the rubbery copolymer of an alkaline earth metal salt of a $C_5$ to $C_{30}$ carboxylic fatty acid, carbon back, between 0.5 and 15 wt. percent based on the rubbery copolymer of zinc oxide; and between 0.05 and 10 parts by weight per 100 parts of the rubbery copolymer of a halide of a heavy metal chosen from the group consisting of Group II–B, IV–B, V, and VIII metals.

5. A composition of claim 4 wherein said metal halide is zinc chloride.

6. A composition of claim 4 wherein said metal halide is stannous chloride.

7. A composition consisting essentially of a major amount of: a rubbery chlorinated copolymer of 85 to 99.5 wt. percent of a $C_4$ to $C_8$ isoolefin and 0.5 to 15 wt. percent of a $C_4$ to $C_{14}$ multiolefin, said copolymer containing at least 0.5 wt. percent combined chlorine but no more than 1 atom of combined chlorine per double bond in the copolymer; between 0.3 and about 7.6 parts by weight per 100 parts of the rubbery copolymer based on copolymer of a calcium salt of a $C_5$ to $C_{30}$ monocarboxylic fatty acid, carbon black, between 0.5 and 15 wt. percent based on the rubbery copolymer of zinc oxide; and between 0.05 and 10 parts by weight per 100 parts by weight of the rubbery copolymer of a halide of a heavy metal selected from the group consisting of Group II–B, IV–B, V, and VIII.

8. The composition of claim 7 wherein said calcium salt is calcium stearate.

9. The composition of claim 7 which contains 0.1 to 5 parts of zinc chloride per 100 parts by weight of rubbery copolymer.

10. A process for overcoming the retardation of vulcanization of a halogenated copolymer of a major portion of a $C_4$ to $C_8$ isoolefin and a minor portion of a $C_4$ to $C_{14}$ multiolefin admixed with carbon black and a vulcanization retarding amount of an alkaline earth metal salt of a $C_5$ to $C_{30}$ monocarboxylic fatty acid, which process comprises, incorporating in the admixture a minor amount of zinc oxide and a halide of a heavy metal chosen from the group consisting of Group II–B, IV–B, V, and VIII metals.

11. The process of claim 10 wherein said copolymer is a chlorinated copolymer of 85 to 99.5 wt. percent of a $C_4$ to $C_8$ isoolefin and 0.5 to 15 wt. percent of a $C_4$ to $C_{14}$ multiolefin.

12. The process of claims 10 wherein incorporated in said admixture is between 0.5 and 15 wt. percent based on the rubber copolymer of zinc oxide and between 0.05 and 10 parts by weight per 100 parts of rubbery copolymer of a zinc halide.

13. The process of claim 10 wherein the alkaline earth metal salt is calcium stearate.

14. The process of claim 10 wherein the vulcanization retarding amount of the alkaline earth metal salt is at least 0.3 part by weight per 100 parts of the halogenated copolymer and wherein the heavy metal halide is a zinc halide.

References Cited by the Examiner

UNITED STATES PATENTS

| 2,238,141 | 4/41 | Walker | 260—45.7 |
| 2,794,791 | 6/57 | Patton et al. | 260—45.75 |
| 2,824,845 | 2/58 | Kosmin | 260—45.7 |
| 2,861,052 | 11/58 | Elliott | 260—45.7 |
| 2,941,975 | 6/60 | Minckler et al. | 260—23.7 |
| 2,958,667 | 11/60 | Eby et al. | 260—23.7 |
| 2,985,608 | 5/61 | Higgins et al. | 260—23.7 |
| 3,099,667 | 7/63 | Gorsich | 260—45.75 |

OTHER REFERENCES

Handbook of Chemistry and Physics, Chemical Rubber and Publishing Company, 33rd edition, 1951–1952, pages 342 and 343.

LEON J. BERCOVITZ, *Primary Examiner.*

ALPHONSO D. SULLIVAN, WILLIAM H. SHORT, *Examiners.*